United States Patent [19]

Bye et al.

[11] 4,166,167

[45] Aug. 28, 1979

[54] POLYMERIZATION OF α-OLEFIN MONOMERS

[75] Inventors: Ashley D. Bye, Welwyn Garden City; John E. Priddle, Welwyn; Victor A. Wilson, Nunthorpe, all of England

[73] Assignee: Imperial Chemical Industries Limited, London, England

[21] Appl. No.: 808,431

[22] Filed: Jun. 20, 1977

[30] Foreign Application Priority Data

Jul. 9, 1976 [GB] United Kingdom ............... 28676/76

[51] Int. Cl.² .................... C08F 2/34; C08F 4/64; C08F 10/00
[52] U.S. Cl. ................... 526/142; 526/151; 526/152; 526/159; 526/164; 526/901; 526/903; 526/904; 526/906; 526/907; 526/908
[58] Field of Search ............... 526/904, 908, 901, 906, 526/907, 903, 142, 151, 152, 159, 164

[56] References Cited

U.S. PATENT DOCUMENTS

| | | | |
|---|---|---|---|
| 2,968,652 | 1/1961 | Mertes | 526/906 |
| 3,041,325 | 6/1962 | Farnham | 526/906 |
| 3,575,948 | 4/1971 | Blunt | 526/907 |
| 3,752,797 | 8/1973 | Gordon et al. | 526/901 |
| 3,772,261 | 11/1973 | Faltings et al. | 526/908 |
| 3,925,338 | 12/1975 | Ort | 526/904 |
| 4,065,609 | 12/1977 | Willmore | 526/904 |

FOREIGN PATENT DOCUMENTS

| | | |
|---|---|---|
| 55421 | 2/1970 | Belgium . |
| 745474 | 2/1970 | Belgium . |
| 2062733 | 6/1971 | France . |
| 1226659 | 3/1971 | United Kingdom ............... 526/901 |
| 1391067 | 4/1975 | United Kingdom . |
| 1391068 | 4/1975 | United Kingdom . |

OTHER PUBLICATIONS

Derwent-31,245Q-Abstract of Russian Pat. 215,503.
Derwent-72994U-Abstract of Japanese Pat. Application 48-59186.

*Primary Examiner*—Alan Holler
*Attorney, Agent, or Firm*—Cushman, Darby & Cushman

[57] ABSTRACT

Gas-phase polymerization of an α-olefin, especially propylene, in a stirred or fluidized bed of substantially uniform and approximately spherical carrier particles of an α-olefin polymer of diameter 100–500 μm, using a catalyst comprising an organo-metallic compound and a solid transition metal compound which has a particle size of less than 5 μm, produces a propylene polymer having unexpectedly good powder flow characteristics. The transition metal compound is conveniently a titanium trichloride-containing material which has been treated with a dialkyl ether solution.

14 Claims, 1 Drawing Figure

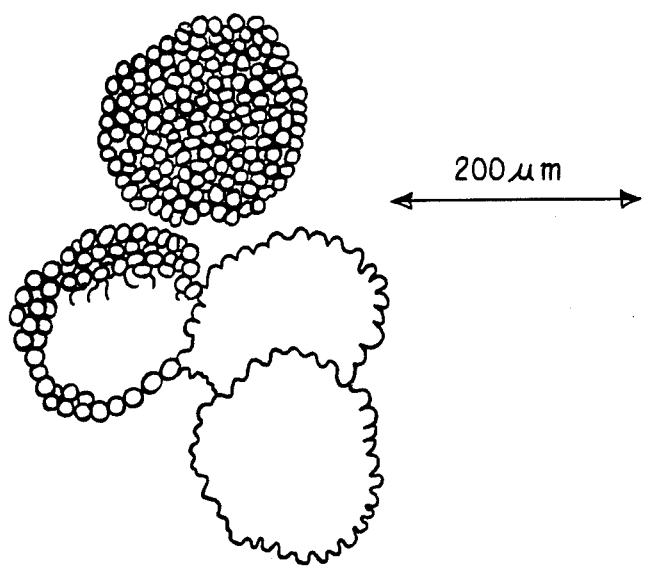

POLYMERIZATION OF α-OLEFIN MONOMERS

This invention relates to the polymerization of α-olefin monomers and in particular to the gas-phase polymerization of α-olefin monomers such as propylene.

According to the present invention, there is provided a process for the production of an olefin polymer wherein at least one α-olefin monomer is polymerized in the gas phase in a stirred or fluidised bed in the presence of particles of a carrier polymer which is an olefin polymer the particles of which are substantially uniform, approximately spherical and essentially all having a diameter in the range from 100 up to 500 microns, polymerization being effected using a catalyst comprising (1) a solid compound of a transition metal of Groups IVA to VIA of the Periodic Table, wherein the transition metal has a valency of less than its maximum valency, the solid compound being in the form of particles essentially all of which have a particle size of less than 5 microns; and (2) at least one organo-metallic compound of aluminum, or of a non-transition metal of Group IIA of the Periodic Table, or a complex of an organo-metallic compound of a non-transition metal or Group IA or IIA of the Periodic Table and an organo-aluminum compound.

A transition metal compound of particle size less than 5 microns is undesirable as a catalyst component in a conventional α-olefin polymerization effected in the presence of liquid diluent since the use of such fine particles would generate very fine polymer powders. However, its use in gas-phase polymerization in a stirred or fluidized bed using the specified carrier polymer results in the production of olefin polymer having unexpectedly good powder flow characteristics. It seems that many of the fine catalyst particles become attached to the particles of carrier polymer, round which the final product appears as a uniform growth of new polymer.

The average particle size of the solid compound of the transition metal is less than 5 microns and is conveniently at least 0.1 microns. Howver, the use of finer particles which do not settle readily from suspension may be advantageous, for example in pumping the solid compound of the transition metal to the polymerization vessel.

The solid compound of a transition metal is preferably a titanium halide, particularly a titanium trihalide especially the trichloride. Suitable forms of titanium trichloride having the requisite particle size are titanium trichloride-containing materials which have been treated with a solution in a hydrocarbon liquid of a dialkyl ether. The titanium trichloride-containing materials are those containing aluminum chloride and/or an organo-aluminium chloride such as ethyl-aluminium dichloride. The ethers are those wherein at least one alkyl group, and preferably both, contains at least four carbon atoms, for example dibutyl ether, di-isoamyl ether or di-decyl ether. The hydrocarbon liquid may be an aliphatic or aromatic liquid in which complexes of the ether and aluminium chloride or organo-aluminium chloride are soluble.

Titanium trichloride-aluminium chloride materials can be obtained by the reduction of titanium tetrachloride with aluminium metal for example using the procedure described in British patent specification No. 877,050. Using such materials, the desired particle size can be achieved by grinding the titanium-aluminium chloride with a solution of the dialkyl ether. The grinding can be effected by ball-milling using either a vibrating or rotating ball-mill. The grinding is effected for an appropriate length of time, which is dependent on the intensity of the milling. Typically, grinding times of from 1 up to 100 hours, particularly from 10 up to 50 hours, can be used. The grinding temperature should be above the freezing point of the hydrocarbon liquid and is very preferably below the boiling point of the hydrocarbon liquid. Typically, the grinding temperature is from $-50°$ C. up to $+50°$ C., especially from $5°$ C. up to $30°$ C., conveniently at ambient temperature. The ether which is ground with the titanium trichloride-aluminium chloride material is conveniently present in a molar quantity at least equal to the amount of aluminium chloride present in the material. The molar quantity of the ether preferably does not exceed twice the amount of titanium trichloride present.

Titanium trichloride-containing materials which contain organo-aluminium chloride can be obtained by reducing titanium tetrachloride with an organo-aluminium compound. The product thus obtained is then treated with the solution of the dialkyl ether. The organo-aluminium compound used for the reduction is either an aluminium trihydrocarbyl compound such as aluminium triethyl or a material which contains a dihydrocarbyl aluminium halide such as diethylaluminium chloride or ethylaluminium sesquichloride. The reduction is effected at a relatively low temperature which is dependent on the particular organo-aluminium compound used. The reduction temperature is typically in the range from $-100°$ C. up to $+30°$ C. If the organo-aluminium compound is an aluminium trihydrocarbyl, the reduction may be effected at any temperature in this range. If the organo-aluminium compound is, or contains, a dialkyl aluminium halide, the reduction may be effected at a temperature of from $-20°$ C. up to $+20°$ C., for example $0°$ C., and the treatment with the ether solution is conveniently effected using a solution of the ether in an aromatic hydrocarbon. After the treatment with the ether solution, the product is very preferably treated with titanium tetrachloride, which may be used neat or as a solution in a suitable inert diluent. The treatments with the dialkyl ether solution, and with the titanium tetrachloride are preferably effected at a temperature not exceeding $100°$ C., particularly from $20°$ C. up to $80°$ C. The quantity of ether used is conveniently at least equal to the total quantity of aluminium compounds present in the reduction product and preferably does not exceed twice the amount of titanium trichloride present. The amount of titanium tetrachloride used may be from 0.1 up to several moles, for example up to 3 moles, for each mole of titanium trichloride.

The organo-metallic component which is component (2) of the catalyst can be a Grignard reagent which is substantially ether-free or a compound such as diphenyl magnesium. Alternatively, this component can be a complex of an organo-metallic compound of a non-transition metal of Groups IA or IIA with an organo-aluminium compound, for example $Mg[Al(C_2H_5)_4]_2$ or lithium aluminium tetraalkyl. It is preferred that component (2) is an organo-aluminium compound such as a hydrocarbyl aluminium sulphate, a hydrocarbyl oxyhydrocarbyl aluminium, or particularly a trihydrocarbyl aluminium or dihydrocarbyl aluminium halide or hydride, especially triethylaluminium or diethylaluminium chloride since catalysts including triethylaluminium give a high polymerization rate whilst catalysts including diethylaluminium chloride give a relatively high percentage yield of the desirable insoluble (isotactic) polymer. A mixture of compounds can be used if desired, for example, a mixture of a trialkyl aluminium and a dialkyl aluminium halide. It may be preferred to use catalysts giving a low level of residual halogen in the polymer product in which case the organo-metallic component is desirably a halogen-free compound, particularly a trihydrocarbyl aluminium.

The gas-phase polymerization may be effected using a catalyst which contains, in addition to components (1) and (2), a further component, component (3), which is an organo-Lewis base compound. This can be any Lewis base which is effective to alter the activity and/or stereospecificity of a Ziegler catalyst system. A wide range of Lewis bases have such an effect and these include compounds containing phosphorus and/or nitrogen atoms, oxygen compounds such as ethers, esters, ketones, and alcohols, and their sulphur-containing analogues, silicon compounds such as silanes and siloxanes, sulphones, sulphonamides and fused-ring heterocyclic sulphur compounds. Particularly useful Lewis bases for use as such a further component include hexamethylphosphoric triamide; 2-dimethylamino-1,3-dimethyl-1,3,2-diazaphospholidine-2-oxide; N,N,N',N',N''-pentamethyl-N''-β-dimethylaminoethyl-phosphoric triamide; octamethylpyrophosphoramide; tri-n-butylphosphine; tri-n-butylamine and N,N,N',N'-tetramethylethylenediamine.

In addition to, or instead of, a Lewis base there may be present a substituted or unsubstituted polyene. This may be an acyclic polyene such as 3-methylhepta-1,4,6-triene or a cyclic polyene such as cyclooctatriene, cyclooctatetraene or particularly cycloheptatriene or derivatives of such cyclic polyenes such as the alkyl- or alkoxy-substituted polyenes, tropylium salts or complexes, tropolone or tropone.

The proportions of the components can vary quite widely depending on the particular materials used and the absolute concentrations of the components. However, in general, for each mole of the transition metal compound which is present in component (1) of the catalyst, there is present at least 0.05, and preferably at least 1.0, and if desired as many as 50 or even more, moles of component (2). In general it is preferred to use not more than 25 moles of the organo-metallic component for each mole of the transition metal catalyst compound present in component (1). If a Lewis base is included, then for each mole of the transition metal compound there is present from 0.01 up to 10, preferably from 0.1 up to 4, moles of the Lewis base, provided that the amount of Lewis base is less than the amount of component (2). Any polyene which is present, plus any Lewis base, should preferably, in total number of moles, be less than the number of moles of component (2). For each mole of component (2), the number of moles of polyene is conveniently in the range 0.01 up to 1.0, especially 0.05 up to 0.5, for example from 0.1 up to 0.2. If both Lewis base and polyene are included, these can conveniently be used in equimolar proportions but the relative proportions of these components may be varies to give the optimum results.

The catalysts employed in the present invention are particularly suitable for the gas-phase polymerization and copolymerization of α-olefins. Any α-olefin monomer which is capable of being polymerized using a Ziegler catalyst may be polymerized by the process of the present invention. Thus, monomers which can be polymerized by the present process include but-1-ene and 4-methylpent-1-ene and particularly propylene. These olefins may be copolymerized together or may preferably be copolymerized with ethylene, conveniently using a sequential polymerization process.

The process of the present invention may be used for the polymerization of propylene and it should be appreciated that the polymerization process may be effected by introducing the propylene monomer into the polymerization vessel as a liquid. Using a feed of liquid monomer, the conditions of temperature and pressure within the polymerization vessel should be such that the liquid monomer vaporises, thereby giving an evaporative cooling effect, and essentially all of the polymerization occurs with the monomer in the gaseous phase.

The polymerization can be effected in the presence of a chain transfer agent such as hydrogen or a zinc dialkyl, in order to control the molecular weight of the product formed. If hydrogen is used as the chain transfer agent it is conveniently used in an amount of from 0.01 up to 5.0%, particularly from 0.10 up to 2.0%, molar relative to the monomer. The amount of chain transfer agent will be dependent on the polymerization conditions, especially the temperature which is typically in the range from 20° C. up to 100° C., preferably from 50° C. up to 80° C.

It is well known that catalysts of the Ziegler type are susceptible to the effects of impurities and the activity and stereospecificity of such catalysts can be affected in a detrimental manner by the presence of small quantities of impurities, particularly oxygen and polar compounds such as water and alcohol, in the monomer. Thus, for the polymerization of olefin monomers using Ziegler type catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, it is desirable that "commercially pure" monomers are further treated to remove detrimental impurities. Any suitable purification treatment can be used and the treatment can be effected in more than one stage if desired. The particular purification treatment used will be dependent on the purity of the starting materials. Satisfactory purity can be achieved in most cases by passing the monomer (or other material required, such as hydrogen) through a bed of a material which is capable of absorbing the impurities for example as described in British patent specifications Nos. 1,111,493 and 1,226,659.

Polymerization may be effected either in a batch manner or on a continuous basis. The catalyst and other components are conveniently introduced into the polymerization vessel separately but it may be possible in certain cases to mix the catalyst and other components together before they are introduced into the polymerization reactor. A proportion of the catalyst and any other components desired may be added to initiate polymerization and further quantities of catalyst and/or one or more of the other components are then added as polymerization proceeds.

Using catalysts in accordance with the invention, propylene may be polymerized to obtain a high yield, relative to the amount of catalyst used, of a polymer having a high flexural modulus which in some cases may be as high as that of commercially available propylene polymers which have been obtained in a lower yield and from which a catalyst removal step is necessary.

The invention is illustrated by the following examples and the accompanying drawing which shows the microscopic appearance of typical particles of the free-flowing polymer obtained as the product of the present invention.

EXAMPLE 1

Purification of Gases for Polymerization

Propylene gas was passed in turn through a column (76 mm diameter, 0.91 m length) containing 1.6 mm granules of 'Alcoa' F1 alumina at 50°–60° C. and through a similar column containing BTS catalyst (cupric oxide reduced to finely divided metallic copper on a magnesium oxide support) at 40°–50° C., and then condensing the issuing gas. The liquid propylene was passed through four columns (all 76 mm diameter, two of 0.91 m length, two of 1.83 m length) at 25° C., each containing 1.6 mm pellets of Union Carbide 3A molecular sieve material. This treatment reduced the water content of the propylene from 5–10 ppm to less than 1 ppm by volume and the oxygen content from 1–2 ppm to less than 0.5 ppm by volume. The level of inert compounds (nitrogen, ethane, &c.) was unchanged at 0.3% and the level of unsaturated hydrocarbons other than propylene (allene, methylacetylene, &c.) remained less than 1 ppm.

Commercially available hydrogen (99.99% pure) was passed through a column (152 mm diameter, 1 meter length) containing Union Carbide 3A molecular sieve material at 20° C. The hydrogen was stored in the sieve column and drawn off as required.

Catalyst for Making Carrier Polymer

Titanium tetrachloride solution (one liter of a 33.33% solution by volume) in an aliphatic hydrocarbon diluent of boiling point 170°–180° C. was placed in a dry nitrogen-pured stainless steel autoclave. The solution was cooled to 0° C. and stirred at 250 rpm, and ethyl aluminium sesquichloride solution (25% by weight) in the same diluent was added over a period of 8 hours to provide 0.9 mole of diethylaluminium chloride (and correspondingly 0.9 mole of ethylaluminium dichloride) per mole of titanium tetrachloride. The mixture was then stirred at 0° C. for a further 2 hours and then heated over a period of 1.5–2.0 hours to 110° C. and stirred at 110° C. for 8 hours. Stirring was then stopped, the solid particles were allowed to settle, and the supernatant liquor was decanted off. The solid was resuspended in diluent (3 liters) and allowed to settle and the liquor again decanted off. This was repeated twice more, and the solid was finally resuspended in diluent for use as catalyst.

Carrier Polymer

Carrier polymer was prepared by a continuous diluent-borne polymerization process operating at a pressure of about 6 atmospheres (about 600 kPa) and a temperature of 60° C. Propylene containing 0.15% by volume of hydrogen was metered to a polymerization train which was continuously fed with an aliphatic hydrocarbon diluent of boiling point 170°–180° C. containing diethylaluminium chloride (8 mmol/liter) and titanium trichloride prepared as described above (4 mmol/liter). Propylene was polymerized to a conversion of about 125 g/mmol titanium trichloride. Catalyst residues were removed by a continuous extraction process in which the "live" polymer slurry was first treated at 70° C. with isopropanol at a level of 2.5% by volume relative to diluent for 75 minutes. Isopropanol containing 10% by volume of water was then added to a level of about 0.5% by volume relative to diluent and treatment was continued for a further 150 minutes. The slurry was finally washed at 40° C. with water, separated, filtered and dried in a fluidized-bed drier at 100° C.

The carrier polymer was thus produced in the form of uniform spherical particles having a particle size distribution (by sieve analysis) as follows: $<150$ $\mu$m, 8.1%; 150–180 $\mu$m, 4.8%; 180–210 $\mu$m, 11.9%; 210–295 $\mu$m, 65.4%; 295–355 $\mu$m, 8.6%; 355–420 $\mu$m, 0.8%; $>420$ $\mu$m, 0.4%. It contained: Ti, 32 ppm; Cl, 34 ppm; Al, 65 ppm. It contained 3.4% of material soluble in hot heptane (determined by Soxhlet extraction for 4 hours using 4 g of polymer and 150 ml of heptane). It had a melt flow index (MFI) of 19.3, measured by ASTM Test Method D 1238-70 Condition N (190° C., 10 kg), and a flexural modulus of 1.34 $GN/m^2$ (which depends on MFI and increases by about 0.18 $GN/m^2$ for a ten-fold increase in MFI).

Measurement of Flexural Modulus

A cantilever beam apparatus as described in *Polymer Age* (March 1970) 57–58 was used to measure deformation at 1% skin strain of annealed strips (150 mm × 19 mm × 1.6 mm) of polymer after 60 seconds at 23° C. and 50% relative humidity. To make test strips, the polymer (23 g) mixed with 0.1% by weight of antioxidant ('Topanol' CA) was converted into a crepe in a Brabender 'Plasticiser' at 190° C. and 30 rpm under a load of 10 kg, and the crepe was pressed into a plaque (from which the strips were cut) between aluminium foil within a template in an electric Tangye press at 250° C. under an applied force of about 1 ton for 6 minutes (just enough pressure to make the polymer flow across the template) and then under an applied force successively of 5 tons, 10 tons and 15 tons with release of pressure between each; after 2 minutes at 15 tons the press was cooled by means of air and water for 10 minutes or until room temperature was reached. Duplicate strips for flexural modulus measurement were annealed in an oven at 130° C. for 2 hours which was then cooled to ambient temperature at 15° C./hour.

Titanium Trichloride Catalyst Ball-Milled with Di-Decyl Ether

A steel ball-mill (140 mm length, 130 mm diameter) containing steel balls (5.95 kg) of 12.5 mm diameter was vacuum/nitrogen-purged and titanium trichloride (Stauffer AA) (100 g; 0.503 mol) and a solution of di-decyl ether (100 g; 121 ml; 0.336 mol) in an aliphatic hydrocarbon diluent of boiling point 170°–180° C. (500 ml) were added. The mill was rolled for 24 hours at 18° C. The contents of the mill were then transferred to a vacuum/nitrogen-purged flask together with 2 × 100 ml aliquots of diluent used to rinse the mill. The catalyst was observed to settle much more slowly than that used to prepare the carrier polymer, indicating that the size of the particles was small (less than 5 $\mu$m). After settling, the liquor was decanted off and the solid was resuspended in diluent, and the procedure was repeated. The slurry was again allowed to settle, the liquor was decanted off, and the solid was resuspended in diluent containing diethylaluminium chloride in amount equimolar to that of titanium trichloride present.

Gas-Phase Polymerization of Propylene

A round-bottomed cylindrical 170-liter polymerization vessel with a water-cooled jacket, fitted with a U-shaped stirrer/scraper rotating at 60 rpm, and charged at a temperature of 70° C. with dry carrier polymer (4 kg) made by the continuous process, was evacuated. After 30 minutes the vacuum was released with propylene and the autoclave was evacuated again, and this procedure was repeated 5 times over 1.5 hours. Propylene was then added in an amount to give a pressure of 50 psi gauge (340 kPa above atmospheric) and diethylaluminium chloride (90 mmol) was added as a solution in heptane. Hydrogen (400 mmol) was added 5 minutes later. Stirring of the autoclave contents was continued for 1 hour, and then the suspension of catalyst ball-milled with di-decyl ether as described above was added over 5 minutes in amount sufficient to provide 10 mmol of titanium trichloride and 10 mmol of diethylaluminium chloride. Propylene gas was admitted 5 minutes later to the top of the autoclave from a heated stock vessel containing liquid propylene. A pressure of 340 psi gauge (2.34 MPa) above atmospheric) was established over a period of about 1 hour, while hydrogen was added in increments to a total amount of 2.6 mol. Polymerization was then carried out at a temperature of 60° C. and a total pressure of 340 psi gauge (2.34 MPa above atmospheric), propylene partial pressure 331 psi (2.28 MPa) gauge, maintained by feeding propylene. Hydrogen was added in increments during the polymerization to maintain an average concentration of 2.7% by volume. The polymerization was terminated after 5 hours by switching off the propylene supply and venting the autoclave to atmospheric pressure. The gas space was purged with nitrogen, and the polymer was emptied out as a free-flowing powder (yield 4.2 kg).

EXAMPLE 2

Triethylaluminium (0.870 mol) as a 25% solution (570 ml) in hexane was added at 10° C. over a period of 14 hours to titanium tetrachloride (240 ml; 2.19 mol) in hexane (480 ml) in a stirred 5-liter glass sinter-bottom flask. After the addition was complete the reaction mixture was stirred at 10° C. for 15 minutes. The resultant slurry was then heated to 65° C. over a period of 20 minutes and held at that temperature for 1 hour,. The heating was then stopped and the slurry was allowed of filter under gravity for 18 hours. The solid was resuspended in hexane (2.5 liters), and a portion of the suspension containing 0.66 mol of titanium trichloride was transferred to a similar flask. Di-isoamyl ether (132 ml; 0.66 mol) was added and the mixture was stirred at 35° C. for 1 hour. The slurry was allowed to filter under gravity for 20 hours. Hexane (260 ml) and titanium tetrachloride (173 ml; 1.57 mol) were added and the mixture was heated to 65° C. and held at this temperature for 2 hours. It was then allowed to settle for 2 hours and the liquor was decanted off. The solid was washed with hexane (750 ml aliquots) five times over a period of 48 hours. The particles of titanium trichloride in this catalyst preparation were very fine (less than 5 $\mu$m in diameter).

The catalyst may be used in a gas-phase polymerization of propylene as described in Example 1 above to give a free-flowing polymer powder.

EXAMPLE 3

A suspension of titanium trichloride was prepared by the method described in Example 5 of British patent specification No. 1,391,067 (which is similar to the procedure described in Example 2 above but using diethylaluminium chloride instead of triethylaluminium for the reduction of titanium tetrachloride), except that when the reduced solid was treated with di-isoamyl ether the diluent used was toluene and not hexane. The catalyst particles were very fine (less than 5 $\mu$m in diameter).

This catalyst may be used in a gas-phase polymerization of propylene as described in Example 1 to give a free-flowing polymer powder.

COMPARATIVE EXAMPLE

Alkyl-Reduced Titanium Trichloride Catalyst

Titanium tetrachloride solution (1.2 liters of a 33.33% solution by volume) in an aliphatic hydrocarbon diluent of boiling point 170°–180° C. was placed in a dry nitrogen-purged stainless steel autoclave. The solution was cooled to and maintained at −9° C. (±1° C.) and stirred at 250 rpm while ethyl aluminium sesquichloride solution (25% by weight) in the same diluent was added over a period of 8 hours in an amount sufficient to provide 1.0 mole of diethylaluminium chloride (and correspondingly 1.0 mole of ethylaluminium dichloride) per mole of titanium tetrachloride. The mixture was then allowed to warm up to a temperature of 6° C. over a period of two hours with stirring. It was then heated to 110° C. over a period of 1 hour and stirred at that temperature for 2 hours. Stirring was then stopped, the solid particles were allowed to settle, and the supernatant liquor was decanted off. The solid was resuspended in diluent (3 liters) and allowed to settle and the liquor again decanted off. This was repeated four times more, and the solid was then resuspended in diluent to give an approximately 1 M suspension. The suspension was then heated to 130° C. over a period of about 1.5 hours and maintained at that temperature for 6 hours. The catalyst was finally washed three times with diluent by decantation by the procedure described above. The final concentration of titanium trichloride in the catalyst suspension was approximately 0.5 M. The particles were similar to those of the catalyst described in Example 1 for making carrier polymer; they were spherical and greater than 5 $\mu$m in diameter.

Gas-Phase Polymerization of Propylene

The preparation of spherical catalyst particles described above was used in place of the ball-milled catalyst in a propylene polymerization in a 170-liter reactor as described in Example 1. A yield of 4.8 kg of polymer powder was obtained. The particles of newly made polymer were not readily distinguished from the carrier particles, and unlike the product of Example 1 there was little sign of new polymer having grown on the carrier polymer particles.

We claim:

1. In a process for the production of an olefin polymer which comprises polymerizing at least one $\alpha$-olefin monomer in the gas phase in a stirred or fluidised bed in the presence of particles of a carrier polymer which is an olefin polymer using a catalyst comprising (1) a solid compound of a transition metal of Groups IVA to VIA of the Periodic Table, wherein the transition metal has a valency of less than its maximum valency; and (2) at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound, the improvement which comprises using as the carrier polymer an olefin polymer the particles of which are substantially uniform, approximately spherical and essentially all of which have a diameter in the range from 100 up to 500 microns and using as component (1) of the catalyst a solid compound of a transition metal essentially all of the particles of which have a particle size of less than 5 microns, wherein component (1) of the catalyst is added to the polymerisation system separately from the carrier polymer.

2. The process of claim 1 wherein the solid transition metal compound which is component (1) has an average particle size of at least 0.1 microns.

3. The process of claim 1 wherein component (1) of the catalyst is the product obtained by treating a titanium trichloride-containing material which also contains aluminium chloride and/or an organo-aluminium chloride, with a solution in a hydrocarbon liquid of a dialkyl ether whereof at least one of the alkyl groups contains at least 4 carbon atoms.

4. The process of claim 3 wherein component (1) of the catalyst is the product obtained by grinding a titanium trichloride-aluminium chloride material with a solution of a dialkyl ether.

5. The process of claim 4 wherein component (1) of the catalyst is the product obtained by ball-milling the titanium trichloride-aluminium chloride material with a solution of di-decyl ether in an aliphatic hydrocarbon.

6. The process of claim 3 wherein the solid transition metal compound which is component (1) of the catalyst is the product of reducing titanium tetrachloride with an organo-aluminium compound at a temperature in the range from −100° C. up to +30° C., treating the reaction product with a solution of a dialkyl ether whereof each alkyl group contains at least 4 carbon atoms, and treating the ether-treated product with titanium tetrachloride.

7. The process of claim 6 wherein the reduction has been effected using an organo-aluminium compound containing a dialkyl aluminium halide and the reaction product is contacted with a solution of the dialkyl ether in an aromatic medium.

8. The process of claim 6 wherein the treatment with the ether and the treatment with titanium tetrachloride are each effected at a temperature not exceeding 100° C.

9. The process of claim 1 wherein the catalyst also includes a further component (component (3)), which is an organo-Lewis base compound.

10. The process of claim 1 wherein the catalyst also includes a substituted or unsubstituted polyene.

11. The process of claim 1 wherein, for each mole of the transition metal compound which is present in component (1) of the catalyst, there is present at least 1.0 up to 50 moles of component (2).

12. The process of claim 9 wherein there is present from 0.01 up to 10 moles of component (3) for each mole of the transition metal component, and the number of moles of component (3) is less than the number of moles of component (2).

13. The process of claim 10 wherein there is present from 0.01 up to 1.0 moles of the polyene for each mole of component (2).

14. The process of claim 1 wherein propylene is polymerized by introducing at least part of the propylene in the liquid phase under conditions of temperature and pressure such that the liquid propylene vaporises and essentially all of the polymerization occurs with the propylene in the gaseous phase.

* * * * *